United States Patent

Yamagisi et al.

[11] 4,234,300
[45] Nov. 18, 1980

[54] EDGE EMBOSSING DEVICE

[75] Inventors: Kikuo Yamagisi; Hiroshi Okuyama; Hideo Kawaguchi, all of Minami-ashigara, Japan

[73] Assignee: Fuji Photo Film Co., Ltd., Minami-ashigara, Japan

[21] Appl. No.: 964,404

[22] Filed: Nov. 28, 1978

[30] Foreign Application Priority Data

Nov. 28, 1977 [JP] Japan .................. 52/142470

[51] Int. Cl.³ .............................. B29C 15/00
[52] U.S. Cl. ........................ 425/363; 264/284
[58] Field of Search ............ 264/284; 425/140, 141, 425/335, 336, 337, 363, 385

[56] References Cited

U.S. PATENT DOCUMENTS

| | | | |
|---|---|---|---|
| 53,920 | 4/1866 | Halsey | 425/363 |
| 197,181 | 11/1877 | Steinlein et al. | 425/385 |
| 822,536 | 6/1906 | Mills | 425/363 |
| 910,790 | 1/1909 | Dahly | 425/369 |
| 1,520,602 | 12/1924 | Schmid | 425/363 |
| 1,946,838 | 2/1934 | Cofrin | 425/335 |
| 2,358,176 | 9/1944 | McDonald | 425/335 |
| 2,857,825 | 10/1958 | Duncan et al. | 425/335 |
| 3,226,280 | 12/1965 | Muller | 264/DIG. 47 |
| 3,502,765 | 3/1970 | Spencer | 264/284 |
| 4,021,179 | 5/1977 | Pira et al. | 425/363 |

Primary Examiner—Paul Lieberman
Assistant Examiner—Arthur H. Koeckert
Attorney, Agent, or Firm—Sughrue, Rothwell, Mion, Zinn and Macpeak

[57] ABSTRACT

An embossing device for roughening a lateral edge of a molded thermo-plastic sheet material by deforming it with a mechanical deforming device is disclosed. The device comprises a pair of rollers whose outer walls are rough and a structure for abutting these rollers against each other under pressure. The rough outer wall of at least one of the pair of rollers having a rough surface is provided with a plurality of relatively smooth stripes. The stripes are arranged in the width-wise direction of said roller.

5 Claims, 5 Drawing Figures

FIG. 1
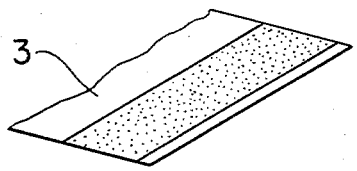
FIG. 2(A)   FIG. 2(B)   FIG. 2(C)
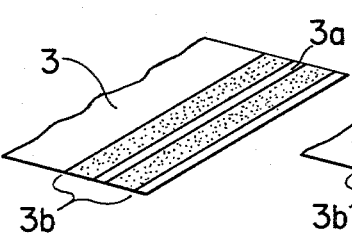 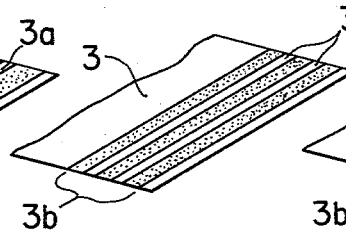 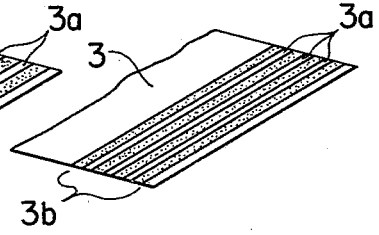
FIG. 3
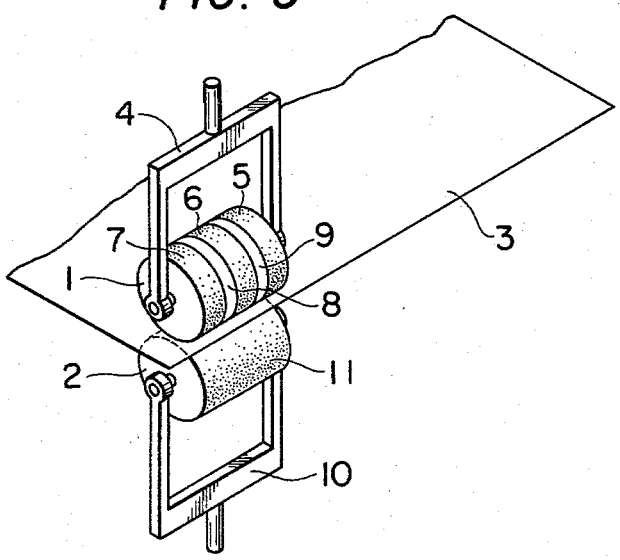

EDGE EMBOSSING DEVICE

BACKGROUND OF THE INVENTION

This invention relates to an embossing device with which a lateral edge of a thermo-plastic sheet material (hereinafter referred to as a film, when applicable) is embossed during the manufacture of the film to facilitate the handling of the film. In manufacturing films, a lateral edge of the film is embossed, or is physically deformed to improve the roll winding characteristic when the film is wound. It also facilitates the handling of the film when it is thereafter subjected to various processes.

An ordinary device for carrying out the physical deformation is generally called "an embossing device". In such a device, a film is inserted between two small rollers about 10 mm in width with minute teeth. In this technique, the film is clamped by the rollers under pressure and is roughened. In this case, the lateral edge of the film is deformed by the force applied to roughen the film, and as a result the lateral edge of the film oten forms "wavy pleats". The wavy pleats are of course poor in appearance, and at worst may greatly degrade the film's handling characteristic in winding or in the subsequent processing of the film.

One of the effects of the above-described embossing process is that if the embossing process is carried out while the film is being heated, then the variation with time of the roughness of the film surface is made lower. Therefore, in order to prevent such variations in the roughness of the film surface, it is desirable to subject the film to the embossing process while the film is being heated. However, this method is disadvantageous in that significant wavy pleats are created in the film. Various prior art techniques have been attempted to remove these pleats.

For example, U.S. Pat. No. 3,502,765 to Spencer (Japanese Patent Publication No. 47-16064) relates to a method of eliminating the above-mentioned wavy pleats and discloses a device wherein a film is partially heated just before the embossing process and is then thereafter shrunken. This compensates for the expansion of the film generated in the embossing process. A technique for partial heating is, however, required for this device and it is difficult to heat particular parts of the film. Furthermore, since it is mandatory to compensate for the expansion of the film generated in the embossing process, the amount of shrinkage must be controlled according to the variation of the force during the embossing process. The shrinkage due to heat is different for different kinds of films. Therefore, the heating temperature must be varied depending on the type of film. Various problems are raised in practical use with this technique.

SUMMARY OF THE INVENTION

In view of the above noted deficiencies, an object of the present invention is to provide an improved film end portion embossing device which eliminates the formation of wavy pleats.

Another object of the present invention is to provide a film end portion embossing device utilizing an embossing process with heating.

The objects of the present invention are achieved by providing an embossing device for roughing a lateral edge of a molded thermoplastic sheet material by deforming it with mechanical deforming means. A pair of rollers whose outer walls are rough is employed together with means for abutting the roller against one other under pressure. The rough outer wall of at least one of the pair of rollers has rough surfaces which are in the form of stripes non-uniform in width and arranged in the width-wise direction of said roller.

Films to be processed by the device according to this invention are not limited, however, it is preferable that films whose glass transition temperatures (Tg) are above room temperature are employed, for example, polyethylene-terephthalate, cellulose acetate, cellulose nitrate, polycarbonate, polystyrene and nylon. These films may be subjected to surface treatment or surface coating if these processes do not degrade the characteristics of the films. The film heating condition in the film embossing process preferably ranges from Tg to Tg+60 (°C).

The thickness of a film to be processed by the device according to the invention is not strictly limited. However, it is preferable that the thickness of the film be in the range from $50\mu$ to $200\mu$.

The embossing depth obtained by the process depends on the kind of film and the film handling characteristic. In general, however, it is preferable that the embossing depth is from 10% to 60% of the thickness of the film.

BRIEF DESCRIPTION OF THE DRAWINGS

FIG. 1 is a perspective view showing a pattern formed by a conventional embossing device;

FIGS. 2A, 2B and 2C perspective views illustrating patterns formed by an embossing device according to this invention; and FIG. 3 is also a perspective view showing a part of one example of the embossing device according to the invention.

DESCRIPTION OF THE PREFERRED EMBODIMENT

A concrete example of the embossing device according to this invention will now be described with reference to the accompanying drawings.

In a conventional embossing process, a film is inserted between a pair of rollers which are about 10 mm in width and have uniformly roughened outer walls. An embossing pattern as shown in FIG. 1 is formed on the film.

The feature of this invention resides in that, as shown in FIG. 2, a portion 3a which is not subjected to embossing process (hereinafter referred to as "a gap section 3a" when applicable) is provided in the film 3.

It is preferable that the width of the gap section 3a is 15–50%, preferably 25–45% of the whole width 3b of the roller placed on the film portion subjected to the embossing process. If the width of the gap section is greater than this range limitation, the problem of creating the aforementioned "wavy pleats" is not caused; however, it becomes difficult to handle the film. If the width of the gap section 3a is smaller than the range limitation, the wavy pleats will be created.

The gap section 3a may be formed as one stripe as shown in FIG. 2(A) or as a plurality of stripes as shown in FIGS. 2(B) and (C). The number of gap sections 3a may be increased depending on the performance of the embossing device. However, generally the provision of two or three gap sections is suitable. The provision of such gap sections by the embossing process can disperse the strain which may otherwise be caused in the film, to prevent the creation of the wavy pleats.

FIG. 3 shows an example of a device for roughing the lateral edge of a sheet 3. An upper roller 1 held in place by a suitable yoke mechanism has roughed portions 5, 6 and 7. Two gap portions 8, 9 are placed between the roughed portions. The upper roller 1 is shown displaced from one end of the sheet 3 so that the pattern shown in FIG. 2(B) is formed. Alternatively if the gap 8 is placed on the end edge, the pattern of FIG. 2(A) will be produced. The lower roller 2 has a suitable yoke mechanism 10. The roller has a continuous rough surface 11. The yokes 4 and 10 are coupled to a pressure generating system (not shown) that abuts the rollers against each other.

As was described above, in the embossing device according to the invention, the rough surface of one of the rollers is partially removed whereby a gap section is provided in a film in the film embossing process. Therefore, the creation of wavy pleats, which may otherwise be formed in the film in the embossing process, can be completely prevented. As a result the film winding and handling characteristics can be remarkably improved. As the device according to the invention can be applied to a film while the film is being heated, the force of pressing the rollers in the embossing process can be smaller. In addition, the physical deformation with time of a film subjected to the embossing process is also smaller, and this effect is maintained for a long time.

In order to clarify the effects of this invention, an actual example and a comparison example will be described below:

ACTUAL EXAMPLE (1) A film to be subjected to the embossing process:

A polyethylene-terephthalate film (100$\mu$ in thickness) biaxially rolled.

(2) The configuration of the embossing rollers (cf. FIG. 3):

The outer wall of the lower roller is 10 mm in width and is roughened with a pitch of 1.5 mm.

The outer wall of the upper roller is roughened with a pitch of 1.5 mm similar to the lower roller, but the outer wall thus roughened is divided into three parts 2.5 mm, 2.0 mm and 2.5 mm in width in such a manner that gap sections 1.5 mm in width are provided between these parts, respectively.

(3) The force of pressing the rollers: 1.5 Kg
(4) Processing temperature:
120° C. (including the device and the film)
(5) Result:

An embossing pattern as shown in the part (B) of FIG. 2 was formed in the film, and no unwanted phenomena such as the creation of "wavy pleats" which degrades the film handling characterisitic were caused.

COMPARISON EXAMPLE

The configuration of only the upper roller was modified as described below the subject the film to an embossing process.

(1) The configuration of the upper roller:

The outer wall of the upper roller was 10 mm in width and was roughened with a pitch of 1.5 mm (similar to the lower roller).

(2) Result:

An embossing pattern as shown in FIG. 1 was formed in the film, and large wavy pleats were created in the film. Thus, the film subjected to the embossing process exhibited unfavourable characteristics in practical use.

We claim:

1. In an embossing device for deforming a lateral edge of a molded thermo-plastic sheet by mechanical means, the improvement comprising, first and second embossing rollers disposed in an opposed relationship on opposite sides of said sheet, said rollers having solid cylindrical outer walls having an exterior embossing pattern thereon composed of a plurality of small, raised surface projections, and at least one of said rollers having at least one intermediate circumferential stripe of a relatively smooth surface devoid of said raised projections, said rollers having a width equal to the width of the lateral edge portion of the sheet being embossed.

2. The device of claim 1, wherein said one roller is provided with a second intermediate smooth circumferential stripe.

3. The device of claim 2 wherein said stripes are of a different width than the width of said areas having said raised projections.

4. The device of claims 1, 2 or 3 wherein the width of said stripes is in the range of 15% to 50% of the width of the roller.

5. The device of claims 1, 3 or 3 wherein the width of said stripes is in the range of 25% to 45% of the width of the roller.

* * * * *